(12) United States Patent
Nomaru

(10) Patent No.: US 7,714,249 B2
(45) Date of Patent: May 11, 2010

(54) LASER BEAM PROCESSING MACHINE

(75) Inventor: Keiji Nomaru, Tokyo (JP)

(73) Assignee: Disco Corporation, Tokyo (JP)

( * ) Notice: Subject to any disclaimer, the term of this patent is extended or adjusted under 35 U.S.C. 154(b) by 841 days.

(21) Appl. No.: 11/602,410

(22) Filed: Nov. 21, 2006

(65) Prior Publication Data

US 2007/0119835 A1 May 31, 2007

(30) Foreign Application Priority Data

Nov. 30, 2005 (JP) ............................. 2005-346514

(51) Int. Cl.
*B23K 26/00* (2006.01)
*B23K 26/04* (2006.01)
*B23K 26/36* (2006.01)

(52) U.S. Cl. ........................... 219/121.62; 219/121.68; 219/121.76

(58) Field of Classification Search ................................ 219/121.61–121.72, 121.76, 121.83
See application file for complete search history.

(56) References Cited

U.S. PATENT DOCUMENTS 4,728,770 A * 3/1988 Kaprelian .............. 219/121.83

| 4,745,289 | A  | * | 5/1988  | Mashima ................... 250/548 |
| 7,355,710 | B2 | * | 4/2008  | Gfrorer et al. ............... 356/417 |
| 7,471,384 | B2 | * | 12/2008 | Nomaru et al. .......... 356/241.1 |
| 7,499,185 | B2 | * | 3/2009  | Nomaru et al. ............. 356/614 |
| 2006/0119691 | A1 | * | 6/2006 | Shigematsu et al. ......... 347/131 |

FOREIGN PATENT DOCUMENTS

JP          3408805       3/2003
JP         2005-297012   10/2005

* cited by examiner

*Primary Examiner*—Samuel M Heinrich
(74) *Attorney, Agent, or Firm*—Smith, Gambrell & Russell, LLP

(57) ABSTRACT

A laser beam processing machine comprising a laser beam application means for applying a laser beam to the top surface of the workpiece held on the chuck table, the laser beam application means comprising a processing laser beam oscillation means for oscillating a processing laser beam and a condenser for converging the processing laser beam oscillated by the processing laser beam oscillation means, wherein the laser beam processing machine further comprises a focal point position adjusting means for adjusting the position of the focal point of the processing laser beam converged by the condenser, a height position detection means for applying a detection laser beam to the workpiece through the focal point position adjusting means to detect the height position of the top surface of the workpiece based on its reflected light, and a control means for controlling the focal point position adjusting means based on the detection value of the height position detection means.

5 Claims, 6 Drawing Sheets

(a)

(b)

(a)

(b)

LASER BEAM PROCESSING MACHINE

FIELD OF THE INVENTION

The present invention relates to a laser beam processing machine for carrying out the laser processing of a plate-like workpiece held on a chuck table along predetermined dividing lines.

DESCRIPTION OF THE PRIOR ART

In the production process of a semiconductor device, a plurality of areas are sectioned by dividing lines called "streets" arranged in a lattice pattern on the front surface of a substantially disk-like semiconductor wafer, and a circuit such as IC or LSI is formed in each of the sectioned areas. Individual semiconductor chips are manufactured by cutting this semiconductor wafer along the dividing lines to divide it into the areas in each of which the circuit is formed. An optical device wafer comprising a gallium nitride-based compound semiconductor laminated on the front surface of a sapphire substrate is also cut along dividing lines to be divided into individual optical devices such as light emitting diodes or laser diodes which are widely used in electric appliances.

Cutting along the dividing lines of the above semiconductor wafer or optical device wafer is generally carried out by a cutting machine called "dicer". This cutting machine has a chuck table for holding a workpiece such as a semiconductor wafer or optical device wafer, a cutting means for cutting the workpiece held on the chuck table, and a cutting-feed means for moving the chuck table and the cutting means relative to each other. The cutting means comprises a spindle unit which is composed of a rotary spindle, a cutting blade mounted on the spindle, and a drive mechanism for rotary-driving the rotary spindle. The cutting blade comprises a disk-like base and an annular cutting-edge which is mounted on the outer peripheral side wall of the base and formed as thick as about 20 μm by fixing diamond abrasive grains having a diameter of about 3 μm to the base by electroforming.

Since a sapphire substrate, silicon carbide substrate, etc. have high Mohs hardness, however, cutting with the above cutting blade is not always easy. Since the cutting blade has a thickness of about 20 μm, the dividing lines for sectioning devices must have a width of about 50 μm. Therefore, in the case of a device measuring about 300 μm×300 μm, there is a problem in that the area ratio of the dividing lines to the wafer becomes 14%, thereby reducing productivity.

Meanwhile, as a means of dividing a plate-like workpiece such as a semiconductor wafer, Japanese Patent No. 3408805 discloses a laser processing method for applying a pulse laser capable of passing through the workpiece with its focal point set to the inside of the area to be divided. In the dividing method making use of this laser processing technique, the workpiece is divided by applying a pulse laser beam having a wavelength of, for example, 1,064 nm capable of passing through the workpiece with its focal point set to the inside from one side of the workpiece to continuously form a deteriorated layer along the dividing lines in the inside of the workpiece and exerting external force along the dividing lines whose strength has been reduced by the formation of the deteriorated layers.

However, when the plate-like workpiece such as a semiconductor wafer has undulations and hence, is not uniform in thickness, the deteriorated layers cannot be formed to a predetermined depth uniformly by irradiation of the laser beam due to its refractive index. Therefore, to form the deteriorated layers to a predetermined depth uniformly in the inside of the semiconductor wafer, it is necessary to detect the unevenness of the area to which a laser beam is to be irradiated, and to make a laser beam application means follow the unevenness in processing.

Further, laser processing by applying a laser beam with its focal point set to the inside of a plate-like workpiece to give a marking in the inside of the workpiece is also implemented. However, to give the marking in the inside of the workpiece to a predetermined depth, the laser beam application means must be followed the unevenness of the surface of the workpiece during processing.

To solve the above problem, JP-A 2005-297012 discloses a laser beam processing machine which comprises a laser beam application means having a condenser for applying a laser beam to a workpiece held on a chuck table to form its focal point, a focal point position adjusting means which moves the focal point formed by the condenser in a direction perpendicular to the workpiece holding surface, a height position detection means for detecting the height position of the laser beam application area of the workpiece held on the chuck table, and a control means for controlling the focal point position adjusting means based on a height position signal detected by the height position detection means.

Since the focal point position adjusting means is controlled based on a height position signal detected by the height position detection means in the laser beam processing machine disclosed by the above publication, there is a slight time lag, and it is difficult to adjust the position of the focal point of the laser beam precisely while following the height position signal.

SUMMARY OF THE INVENTION

It is an object of the present invention to provide a laser beam processing machine capable of carrying out processing of a plate-like workpiece at a desired position precisely even when the workpiece is not uniform in thickness.

To attain the above object, according to the present invention, there is provided a laser beam processing machine comprising a chuck table having a workpiece holding surface for holding a plate-like workpiece and a laser beam application means for applying a laser beam to the top surface of the workpiece held on the chuck table, the laser beam application means comprising a processing laser beam oscillation means for oscillating a processing laser beam and a condenser for converging the processing laser beam oscillated by the processing laser beam oscillation means, wherein the laser beam processing machine further comprises a focal point position adjusting means which is interposed between the processing laser beam oscillation means and the condenser and shifts the position of the focal point of the processing laser beam converged by the condenser, a height position detection means for detecting the height position of the top surface of the workpiece held on the chuck table, and a control means for controlling the focal point position adjusting means based on a detection signal from the height position detection means;

the height position detection means comprises a detection laser beam oscillation means for oscillating a detection laser beam having a wavelength different from the wavelength of the processing laser beam oscillated by the processing laser beam oscillation means, a dichroic half mirror which is interposed between the processing laser beam oscillation means and the focal point position adjusting means, allows the processing laser beam oscillated from the processing laser beam oscillation means to pass through and deflects a detection laser beam oscillated from the detection laser beam oscillation means toward the focal point position adjusting means, a first splitter which is interposed between the dichroic half mirror and the detection laser beam oscillation means, allows the detection laser beam oscillated from the detection laser beam oscillation means and deflects reflected light deflected by the dichroic half mirror, a band pass filter which allows only reflected light corresponding to the wavelength of the detection laser beam to pass through, out of the reflected light deflected by the first splitter, a second splitter which splits the reflected light passing through the band pass filter into a first route and a second route, a first light receiving device for receiving the reflected light split into the first route by the second splitter, a second light receiving device for receiving the reflected light split into the second route by the second splitter, and a light receiving area restricting means which is arranged in the second route and restricts the reception area of the reflected light received by the second light receiving device; and the control means calculates the ratio of the quantity of light received by the first light receiving device to the quantity of light received by the second light receiving device and controls the focal point position adjusting means so that the ratio becomes a predetermined value.

A condenser lens for converging 100% of the reflected light split into the first route and transmitting the converged light to the first light receiving device is installed in the first route, and the light receiving area restricting means is composed of a cylindrical lens for converging the reflected light split into the second route one-dimensionally and a one-dimensional mask for restricting the reflected light converged by the cylindrical lens one-dimensionally to a unit length.

A condenser lens for converging 100% of the reflected light split into the first route and transmitting the converged light to the first light receiving device is installed in the first route, and the light receiving area restricting means is a two-dimensional mask for restricting the reflected light split into the second route to a unit area.

Preferably, the above focal point position adjusting means comprises a first galvanoscanner and a second galvanoscanner, each consisting of a first mirror and a second mirror which are arranged parallel to each other with their reflected surfaces opposed to each other and an angle adjusting actuator for adjusting the installation angles of the first mirror and the second mirror.

Further, the position of the focal point of the detection laser beam is desirably set to the inside of the workpiece held on the chuck table.

In the laser beam processing machine according to the present invention, the detection laser beam is applied to the workpiece through the focal point position adjusting means for adjusting the focal point of the processing pulse laser beam to detect the height position of the workpiece based on its reflected light, and the focal point position adjusting means is controlled based on this detection value. Therefore, the position of the focal point of the processing laser beam can be adjusted in accordance with the undulation of the workpiece without producing a time lag. Consequently, laser processing can be made at a position parallel to the surface of the workpiece.

DETAILED DESCRIPTION OF THE PREFERRED EMBODIMENTS

Preferred embodiments of the laser beam processing machine constituted according to the present invention will be described in more detail with reference to the accompanying drawings.

Figure 1:
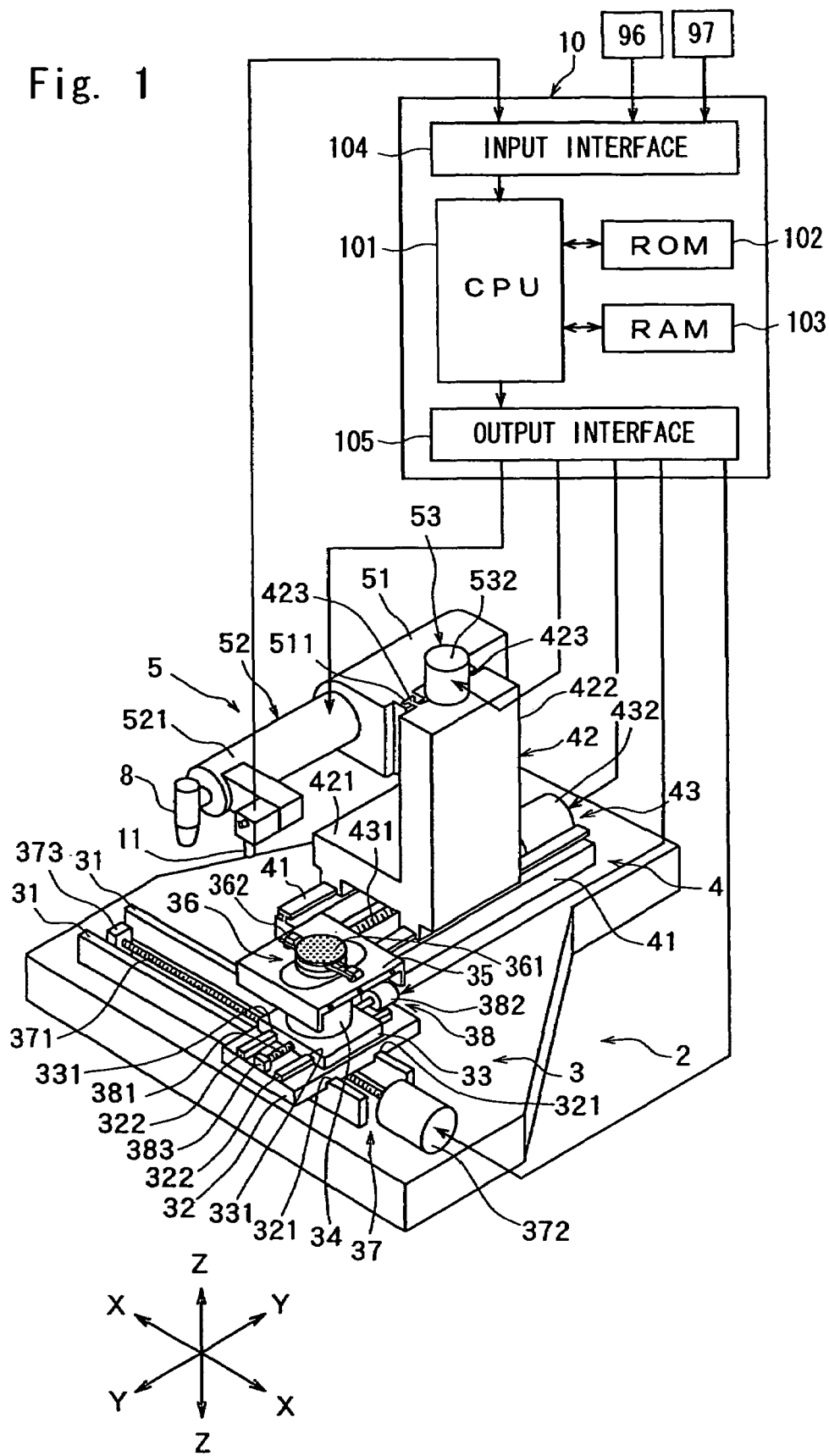
FIG. 1 is a perspective view of a laser beam processing machine constituted according to the present invention.

FIG. 1 is a perspective view of a laser beam processing machine constituted according to the present invention. The laser beam processing machine shown in FIG. 1 comprises a stationary base 2, a chuck table mechanism 3 for holding a workpiece, which is mounted on the stationary base 2 in such a manner that it can move in a processing-feed direction indicated by an arrow X, a laser beam application unit support mechanism 4 mounted on the stationary base 2 in such a manner that it can move in an indexing-feed direction indicated by an arrow Y perpendicular to the direction indicated by the arrow X, and a laser beam application unit 5 mounted on the laser beam application unit support mechanism 4 in such a manner that it can move in a direction indicated by an arrow Z.

The above chuck table mechanism 3 comprises a pair of guide rails 31 and 31 which are mounted on the stationary base 2 and arranged parallel to each other in the processing-feed direction indicated by the arrow X, a first sliding block 32 mounted on the guide rails 31 and 31 in such a manner that it can move in the processing-feed direction indicated by the arrow X, a second sliding block 33 mounted on the first sliding block 32 in such a manner that it can move in the indexing-feed direction indicated by the arrow Y, a support table 35 supported on the second sliding block 33 by a cylindrical member 34, and a chuck table 36 as a workpiece holding means. This chuck table 36 comprises an adsorption chuck 361 made of a porous material so that a disk-like semiconductor wafer as the workpiece is held on the adsorption chuck 361 by a suction means that is not shown. The chuck table 36 constituted as described above is rotated by a pulse motor (not shown) installed in the cylindrical member 34. The chuck table 36 is provided with clamps 362 for fixing an annular frame which will be described later.

The above first sliding block 32 has, on its undersurface, a pair of to-be-guided grooves 321 and 321 to be fitted to the above pair of guide rails 31 and 31 and, on the top surface, a pair of guide rails 322 and 322 formed parallel to each other in the indexing-feed direction indicated by the arrow Y. The first sliding block 32 constituted as described above can move in the processing-feed direction indicated by the arrow X along the pair of guide rails 31 and 31 by fitting the to-be-guided grooves 321 and 321 to the pair of guide rails 31 and 31, respectively. The chuck table mechanism 3 in the illustrated embodiment comprises processing-feed means 37 for moving the first sliding block 32 along the pair of guide rails 31 and 31 in the processing-feed direction indicated by the arrow X. The processing-feed means 37 has a male screw rod 371 arranged between the above pair of guide rails 31 and 31 and parallel thereto, and a drive source such as a pulse motor 372 for rotary-driving the male screw rod 371. The male screw rod 371 is, at its one end, rotatably supported to a bearing block 373 fixed on the above stationary base 2 and is, at the other end, transmission-coupled to the output shaft of the above pulse motor 372. The male screw rod 371 is screwed into a threaded through-hole formed in a female screw block (not shown) projecting from the undersurface of the center portion of the first sliding block 32. Therefore, by driving the male screw rod 371 in a normal direction or reverse direction with the pulse motor 372, the first sliding block 32 is moved along the guide rails 31 and 31 in the processing-feed direction indicated by the arrow X.

The above second sliding block 33 has, on its undersurface, a pair of to-be-guided grooves 331 and 331 to be fitted to the pair of guide rails 322 and 322 on the top surface of the above first sliding block 32 and can move in the indexing-feed direction indicated by the arrow Y by fitting the to-be-guided grooves 331 and 331 to the pair of guide rails 322 and 322, respectively. The chuck table mechanism 3 in the illustrated embodiment comprises a first indexing means 38 for moving the second sliding block 33 in the indexing-feed direction indicated by the arrow Y along the pair of guide rails 322 and 322 on the first sliding block 32. The first indexing means 38 has a male screw rod 381 which is arranged between the above pair of guide rails 322 and 322 and parallel thereto, and a drive source such as a pulse motor 382 for rotary-driving the male screw rod 381. The male screw rod 381 is, at its one end, rotatably supported to a bearing block 383 fixed on the top surface of the above first sliding block 32 and is, at the other end, transmission-coupled to the output shaft of the above pulse motor 382. The male screw rod 381 is screwed into a threaded through-hole formed in a female screw block (not shown) projecting from the undersurface of the center portion of the second sliding block 33. Therefore, by driving the male screw rod 381 in a normal direction or reverse direction with the pulse motor 382, the second sliding block 33 is moved along the guide rails 322 and 322 in the indexing-feed direction indicated by the arrow Y.

The above laser beam application unit support mechanism 4 comprises a pair of guide rails 41 and 41 mounted on the stationary base 2 and arranged parallel to each other in the indexing-feed direction indicated by the arrow Y and a movable support base 42 mounted on the guide rails 41 and 41 in such a manner that it can move in the direction indicated by the arrow Y. This movable support base 42 consists of a movable support portion 421 movably mounted on the guide rails 41 and 41 and a mounting portion 422 mounted on the movable support portion 421. The mounting portion 422 is provided with a pair of guide rails 423 and 423 extending parallel to each other in the direction indicated by the arrow Z on one of its flanks. The laser beam application unit support mechanism 4 in the illustrated embodiment comprises a second indexing-feed means 43 for moving the movable support base 42 along the pair of guide rails 41 and 41 in the indexing-feed direction indicated by the arrow Y. This second indexing-feed means 43 has a male screw rod 431 arranged between the above pair of guide rails 41 and 41 and parallel thereto, and a drive source such as a pulse motor 432 for rotary-driving the male screw rod 431. The male screw rod 431 is, at its one end, rotatably supported to a bearing block (not shown) fixed on the above stationary base 2 and is, at the other end, transmission-coupled to the output shaft of the above pulse motor 432. The male screw rod 431 is screwed into a threaded through-hole formed in a female screw block (not shown) projecting from the undersurface of the center portion of the movable support portion 421 constituting the movable support base 42. Therefore, by driving the male screw rod 431 in a normal direction or reverse direction with the pulse motor 432, the movable support base 42 is moved along the guide rails 41 and 41 in the indexing-feed direction indicated by the arrow Y.

The laser beam application unit 5 in the illustrated embodiment comprises a unit holder 51 and a laser beam application means 52 secured to the unit holder 51. The unit holder 51 has a pair of to-be-guided grooves 511 and 511 to be slidably fitted to the pair of guide rails 423 and 423 on the above mounting portion 422 and is supported in such a manner that it can move in the direction indicated by the arrow Z by fitting the to-be-guided grooves 511 and 511 to the above guide rails 423 and 423, respectively.

Figure 2:
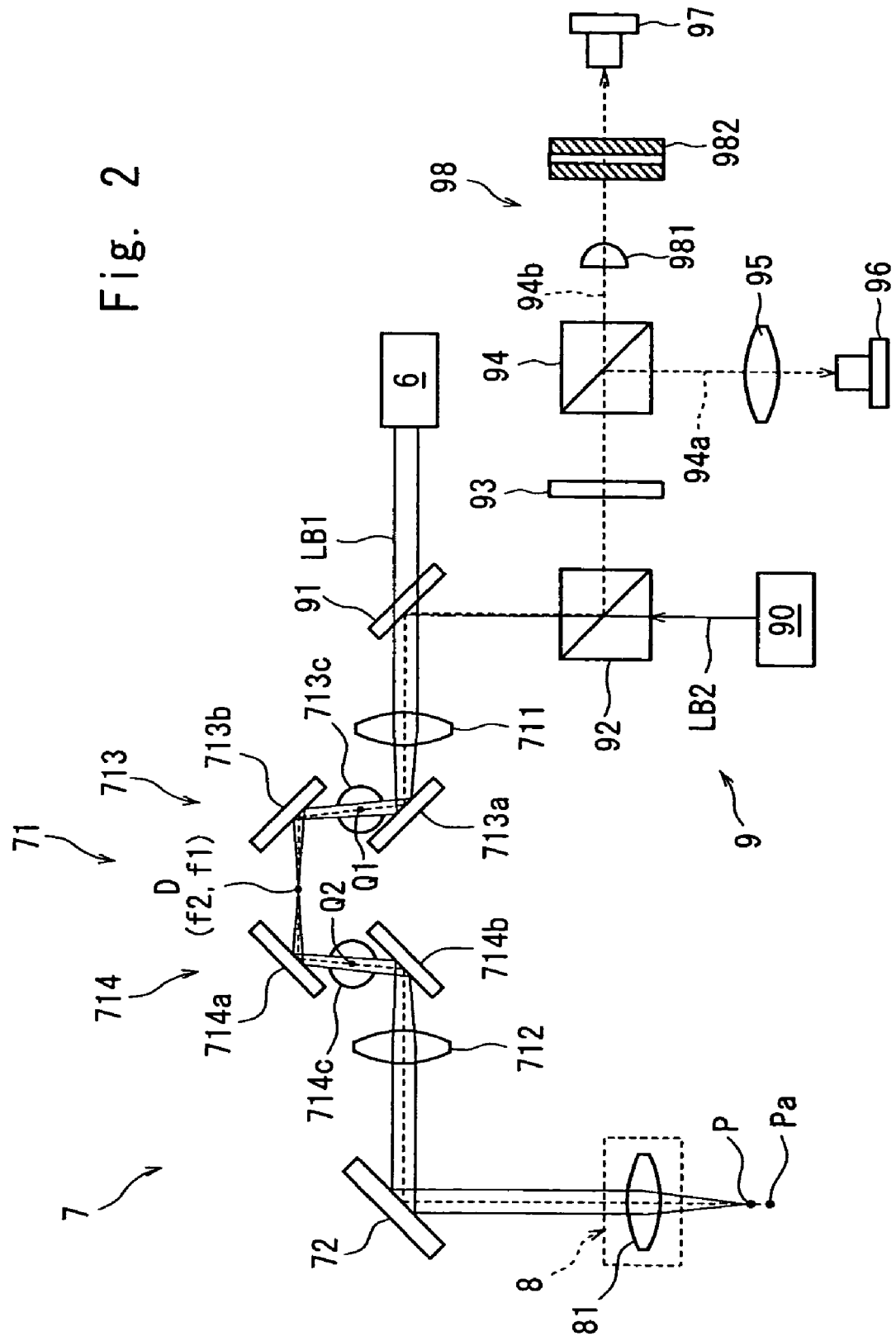
FIG. 2 is a block diagram schematically showing the constitution of a laser beam processing means and a height position detection means provided in the laser beam processing machine shown in FIG. 1.

The illustrated laser beam application means 52 comprises a cylindrical casing 521 extending substantially horizontally. In the casing 521, there are installed a processing pulse laser beam oscillation means 6 and an optical transmission means 7 for transmitting a processing pulse laser beam oscillated by this processing pulse laser beam oscillation means 6 as shown in FIG. 2. A condenser 8 comprising a condenser lens 81 for converging a laser beam transmitted through the optical transmission means 7 is mounted onto the end of the casing 521 (see FIG. 1). The processing pulse laser beam oscillation means 6 oscillates a processing pulse laser beam LB1 having permeability for a wafer as the workpiece. As this processing pulse laser beam oscillation means 6 may be used a YVO4 pulse laser oscillator or a YAG pulse laser oscillator for oscillating a processing pulse laser beam LB1 having a wavelength of, for example, 1,064 nm when the wafer comprises a silicon substrate, silicon carbide substrate, lithium tantalate substrate, glass substrate or quartz substrate.

The optical transmission means 7 comprises a focal point position adjusting means 71 for shifting the position of a focal point at which the processing pulse laser beam LB1 oscillated from the processing pulse laser beam oscillation means 6 is converged by the condenser lens 81 and a direction changing mirror 72 for changing the direction of the processing pulse laser beam LB1 transmitted through the focal point position adjusting means 71 to a downward direction at 90° in FIG. 2. The focal point position adjusting means 71 comprises a first convex lens 711 and a second convex lens 712 which are spaced apart from each other, and a first galvanoscanner 713 for reflecting and deflecting a laser beam passing through the first convex lens 711 and a second galvanoscanner 714 for reflecting and deflecting the laser beam reflected and deflected by the first galvanoscanner 713, which are interposed between the first convex lens 711 and the second convex lens 712.

Figure 3:
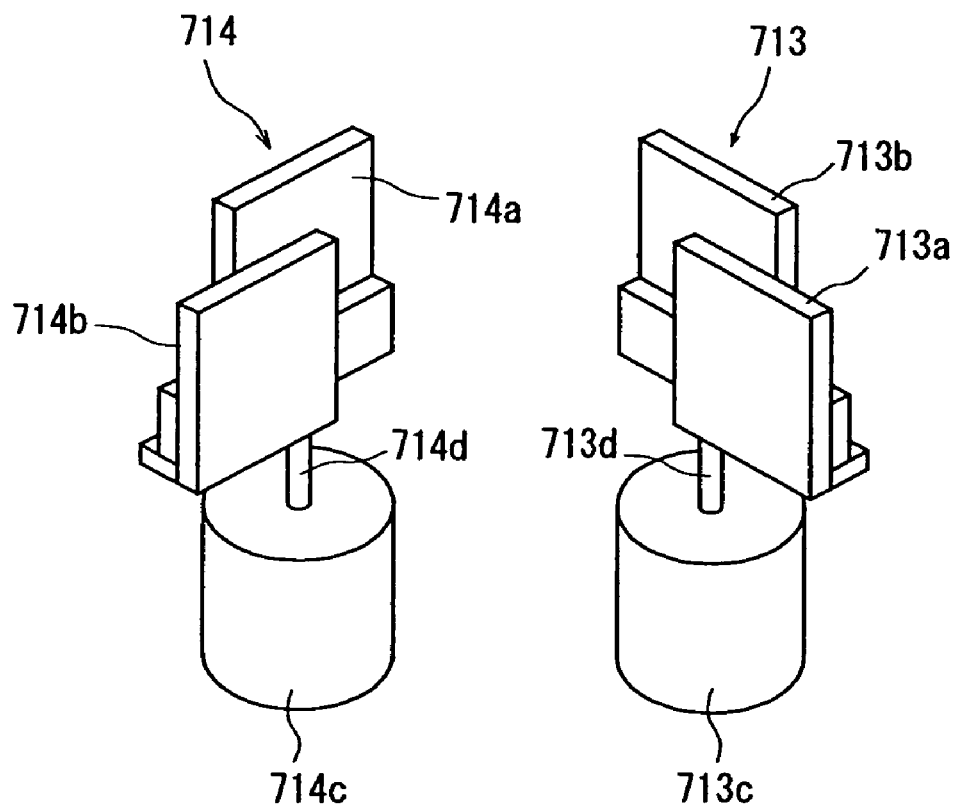
FIG. 3 is a perspective view of a first galvanoscanner and a second galvanoscanner constituting the height position detection means shown in FIG. 2.

As shown in FIG. 3, the first galvanoscanner 713 is constituted by a pair of first mirror 713a and second mirror 713b which are arranged parallel to each other at a predetermined interval with their reflective surfaces opposed to each other, and an angle adjusting actuator 713c for adjusting the installation angles of the first mirror 713a and the second mirror 713b. As shown in FIG. 2, the first mirror 713a of the first galvanoscanner 713 constituted as described above reflects and deflects a laser beam passing through the first convex lens 711 toward the second mirror 713b, and the second mirror 713b reflects and deflects the laser beam reflected and deflected by the first mirror 713a toward the second galvanoscanner 714. A turning shaft 713d of the angle adjusting actuator 713c is transmission-coupled to each of a connection member connecting the first mirror 713a to the second mirror 713b of the pair. The angle adjusting actuator 713c is controlled by a control means which will be described later to change the installation angles of the pair of first mirror 713a and second mirror 713b.

The second galvanoscanner 714 is arranged to be opposed to the first galvanoscanner 713, and is constituted by a pair of first mirror 714a and second mirror 714b which are arranged parallel to each other at a predetermined interval with their reflective surfaces opposed to each other, and an angle adjusting actuator 714c for adjusting the installation angles of the first mirror 714a and the second mirror 714b. As shown in FIG. 2, the first mirror 714a of the second galvanoscanner 714 constituted as described above reflects and deflects the laser beam reflected and deflected by the second mirror 713b of the first galvanoscanner 713 toward the second mirror 714b, and the second mirror 714b reflects and deflects the laser beam reflected and deflected by the first mirror 714a toward the above direction changing mirror 72. A turning shaft 714d of the angle adjusting actuator 714c is transmission-coupled to a connection member connecting the first mirror 714a and to the second mirror 714b of the pair. The angle adjusting actuator 714c is controlled by the control means which will be described later to change the installation angles of the pair of first mirror 714a and second mirror 714b.

The above focal point position adjusting means 71 is constituted in such a manner that the focal point (f1) of the first convex lens 711 and the focal point (f2) of the second convex lens 712 are located at a convergent point D between the second mirror 713b of the first galvanoscaner 713 and the first mirror 714a of the second galvanoscanner 714 in the state shown in FIG. 2. In this state, the pulse laser beam applied from the second convex lens 712 toward the direction changing mirror 72 becomes parallel. And, the first mirror 713a and the second mirror 713b of the first galvanoscanner 713 and the first mirror 714a and the second mirror 714b of the second galvanoscanner 714 can be turned on points Q1 and Q2 about which they become symmetrical, as the centers thereof.

In the focal point position adjusting means 71 constituted as described above, the processing pulse laser beam LB1 oscillated from the processing pulse laser beam oscillation means 6 is guided to the direction changing mirror 72 through the first convex lens 711, the first mirror 713a and the second mirror 713b of the first galvanoscanner 713, the first mirror 714a and the second mirror 714b of the second galvanoscanner 714, and the second convex lens 712. The pair of first mirror 713a and second mirror 713b and the pair of first mirror 714a and second mirror 714b are turned on the points Q1 and Q2 as the centers thereof by the angle adjusting actuator 713c of the first galvanoscanner 713 and the angle adjusting actuator 714c of the second galvanoscanner 714, respectively, to change the installation angles of the mirrors, thereby making it possible to shift the focal point (f1) of the first convex lens 711 and the focal point (f2) of the second convex lens 712 in the horizontal direction in FIG. 2.

In the focal point position adjusting means 71 constituted as described above, the focal point (f1) of the first convex lens 711 and the focal point (f2) of the second convex lens 712 are constituted to coincide at the convergent point D as described above and the processing pulse laser beam LB1 transmitted from the second convex lens 712 toward the direction changing mirror 72 becomes parallel in the state shown in FIG. 2. In this case, the focal point P formed by the condenser lens 81 is located at the position shown in FIG. 2. On the one hand, when the first mirror 713a and the second mirror 713b of the first galvanoscanner 713 and the first mirror 714a and the second mirror 714b of the second galvanoscanner 714 are turned in one direction on the points Q1 and Q2 as the centers thereof, the focal point (f1) of the first convex lens 711 shifts to the left side in FIG. 2 of the above convergent point D, and the focal point (f2) of the second convex lens 712 shifts to the right side in FIG. 2 of the above convergent point D, the processing pulse laser beam LB1 applied from the second convex lens 712 toward the direction changing mirror 72 broadens toward the end. As a result, the processing pulse laser beam LB1 applied to the condenser lens 81 through the direction changing mirror 72 also broadens toward the end, whereby the focal point P formed by the condenser lens 81 shifts from the position shown in FIG. 2 in the downward direction. On the other hand, when the first mirror 713a and the second mirror 713b of the first galvanoscanner 713 and the first mirror 714a and the second mirror 714b of the second galvanoscanner 714 are turned in the other direction on the points Q1 and Q2 as the centers thereof, the focal point (f1) of the first convex lens 711 shifts to the right side in FIG. 2 of the above convergent point D, and the focal point (f2) of the second convex lens 712 shifts to the left side in FIG. 2 of the above convergent point D, the processing pulse laser beam LB1 applied from the second convex lens 712 toward the direction changing mirror 72 tapers. As a result, the processing pulse laser beam LB1 applied to the above condenser lens 81 through the direction changing mirror 72 also tapers, whereby the focal point P formed by the condenser lens 81 shifts from the position shown in FIG. 2 in the upward direction.

The condenser 8 having the above condenser lens 81 is mounted on the end portion of the above casing 521. This condenser 8 is constituted by a set of lenses including the condenser lens 81, and converges the processing pulse laser beam LB1 oscillated by the above processing pulse laser beam oscillation means 6 and transmitted through the focal point position adjusting means 71 and the direction changing mirror 72 at the focal point P.

With reference to FIG. 2, the laser beam processing machine in the illustrated embodiment has a height position detection means 9 for detecting the height position of the top surface of the workpiece held on the chuck table. The height position detection means 9 comprises a detection laser beam oscillation means 90 for oscillating a detection laser beam, a dichroic half mirror 91 which is interposed between the above processing pulse laser beam oscillation means 6 and the focal point position adjusting means 71 and reflects and deflects a detection laser beam oscillated from the detection laser beam oscillation means 90 toward the focal point position adjusting means 71, and a first cubic splitter 92 interposed between the dichroic half mirror 91 and the detection laser beam oscillation means 90. The detection laser beam oscillation means 90 oscillates a laser beam having a frequency different from that of the processing pulse laser beam oscillated from the above processing pulse laser beam oscillation means 6. As this detection laser beam oscillation means 90 may be used a He—Ne pulse laser oscillator which oscillates a detection laser beam LB2 having a wavelength of, for example, 632 nm. The dichroic half mirror 91 transmits the processing pulse laser beam LB1 but reflects and deflects the detection laser beam LB2 toward the focal point position adjusting means 71. The first cubic splitter 92 transmits the detection pulse laser beam LB2 and reflects and deflects the light reflected and deflected by the dichroic half mirror 91.

The height position detection means 9 in the illustrated embodiment comprises a band pass filter 93 which transmits only reflected light corresponding to the frequency of the detection laser beam LB2 out of light reflected by the first cubic splitter 92, a second cubic splitter 94 for dividing the reflected light passing through the band pass filter 93 into a first route 94a and a second route 94b, a condenser lens 95 for converging 100% of the reflected light split into the first route 94a by the second cubic splitter 94, and a first light receiving device 96 for receiving the reflected light converged by the condenser lens 95. The first light receiving device 96 supplies a voltage signal corresponding to the quantity of received light to the control means which will be described later. The height position detection means 9 in the illustrated embodiment comprises a second light receiving device 97 for receiving the reflected light split into the second route 94b by the second cubic splitter 94 and a light receiving area restricting means 98 for restricting the reception area of the reflected light received by the second light receiving device 97. The light receiving area restricting means 98 in the illustrated embodiment is composed of a cylindrical lens 981 for converging the reflected light split into the second route 94b by the second cubic splitter 94 one-dimensionally and a one-dimensional mask 982 for restricting the reflected light converged by the cylindrical lens 981 one-dimensionally to a unit length. The second light receiving device 97 for receiving the reflected light passing through the one-dimensional mask 982 supplies a voltage signal corresponding to the quantity of received light to the control means which will be described later.

The height position detection means 9 in the illustrated embodiment is constituted as described above, and its function will be described hereinbelow.

The detection laser beam LB2 oscillated by the detection laser beam oscillation means 90 passes through the first cubic splitter 92, reaches the dichroic half mirror 91 and is reflected and deflected by the dichroic half mirror 91 toward the focal point position adjusting means 71. The detection laser beam LB2 reflected and deflected toward the focal point position adjusting means 71 is converged by the condenser lens 81 through the focal point position adjusting means 71 and the direction changing mirror 72, like the above processing pulse laser beam LB1. As the detection laser beam LB2 oscillated from the detection laser beam oscillation means 90 is preferably used a laser beam having a wide angle, whose focal point converged by the condenser lens 81 is so as to be positioned below the focal point P of the processing pulse laser beam LB1 oscillated from the above processing pulse laser beam oscillation means 6 in FIG. 2. The detection laser beam LB2 converged as described above is reflected on the top surface of the workpiece held on the chuck table 36, and this reflected light reaches the band pass filter 93 through the condenser lens 81, the direction changing mirror 72, the focal point position adjusting means 71, the dichroic half mirror 91 and the first cubic splitter 92 as indicated by the broken line in FIG. 2. The reflected light of the above processing pulse laser beam LB1 also reaches the band pass filter 93 through the same route like the detection pulse laser beam LB2. Since the band pass filter 93 is constituted to transmit only reflected light corresponding to the frequency of the detection pulse laser beam LB2 as described above, the reflected light of the processing pulse laser beam LB1 is cut off by the band pass filter 93. Therefore, only the reflected light of the detection pulse laser beam LB2 passes through the band pass filter 93 and reaches the second cubic splitter 94.

The reflected light of the detection pulse laser beam LB2 which has reached the second cubic splitter 94 is split into the first route 94a and the second route 94b. The reflected light split into the first route 94a is 100% converged by the condenser lens 95 and received by the first light receiving device 96. The first light receiving device 96 supplies a voltage signal corresponding to the quantity of received light to the control means which will be described later. Meanwhile, the reflected light of the detection pulse laser beam LB2 split into the second route 94b is converged one-dimensionally by the cylindrical lens 981 of the light receiving area restricting means 98, restricted to the predetermined unit length by the one-dimensional mask 982 and received by the second light receiving device 97. The second light receiving device 97 supplies a voltage signal corresponding to the quantity of received light to the control means which will be described later.

A description is subsequently given of the quantity of the reflected light of the detection pulse laser beam LB2 received by the first light receiving device 96 and the second light receiving device 97.

Since the reflected light of the detection pulse laser beam LB2 received by the first light receiving device 96 is 100% converged by the condenser lens 95, the quantity of received light is constant and a voltage value (V1) output from the first light receiving device 96 is constant (for example, 10 V). Meanwhile, since the reflected light of the detection pulse laser beam LB2 received by the second light receiving device 97 is one-dimensionally converged by the cylindrical lens 981, restricted to the predetermined unit length by the one-dimensional mask 982 and received by the second light receiving device 97, the quantity of light received by the second light receiving device 97 changes according to the position of the focal point Pa of the detection laser beam LB2 converged by the condenser lens 81 of the condenser 8 in the workpiece. Therefore, the voltage value output from the second light receiving device 97 changes according to the position of the focal point Pa of the detection laser beam LB2 in the workpiece W.

For instance, when the focal point Pa of the detection laser beam LB2 is at a shallow position from the surface of the workpiece W as shown in FIG. 4(a), the detection laser beam LB2 is reflected on the area S1 applied on the surface of the workpiece W. This reflected light is split into the first route 94a and the second route 94b by the second cubic splitter 94 as described above. Since the reflected light from the area S1 split into the first route 94a is 100% converged by the condenser lens 95, the total quantity of the reflected light is received by the first light receiving device 96. Meanwhile, since the reflected light from the area S1 split into the second route 94b by the second cubic splitter 94 is one-dimensionally converged by the cylindrical lens 981, its section becomes elliptic. As the reflected light having an elliptic section is restricted to the predetermined unit length by the one-dimensional mask 98, part of the reflected light split into the second route 94b is received by the second light receiving device 97. Therefore, the quantity of the reflected light received by the second light receiving device 97 becomes smaller than the quantity of light received by the first light receiving device 96.

Figure 4:
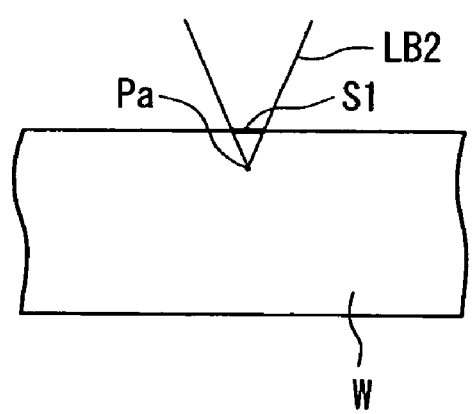
FIGS. 4(a) and 4(b) are explanatory diagrams showing a change in the position of the focal point of a detection laser beam applied from the height position detection means shown in FIG. 2.
Figure 4:
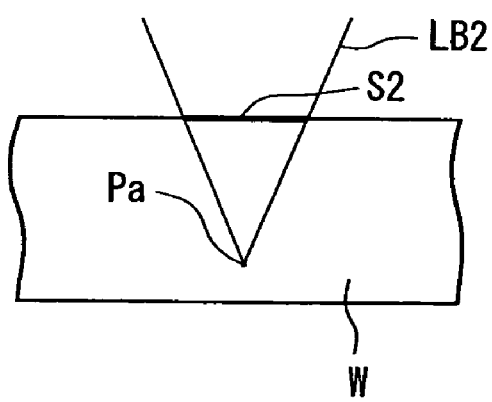

When the focal point Pa of the detection laser beam LB2 is deeper than the position shown in FIG. 4(a) as shown in FIG. 4(b), the detection laser beam LB2 is reflected on the area S2 applied on the surface of the workpiece W. This area S2 is larger than the above area S1. The reflected light from the area S2 is split into the first route 94a and the second route 94b by the second cubic splitter 94. Since the reflected light from the area S2 split into the first route 94a is 100% converged by the condenser lens 95, the total quantity of the reflected light is received by the first light receiving device 96. Meanwhile, since the reflected light from the area S2 split into the second route 94b by the second cubic splitter 94 is one-dimensionally converged by the cylindrical lens 981, its section becomes elliptic. The length of the long axis of this ellipse becomes larger than that shown in FIG. 4(a) as the area S2 of the reflected light is larger than the above area S1. The reflected light converged to have an elliptic section is restricted to the predetermined length by the one-dimensional mask 982, and part of the reflected light is received by the second light receiving device 97. Therefore, the quantity of light received by the second light receiving device 97 becomes smaller than that shown in FIG. 4 (a). The quantity of reflected light received by the second light receiving device 97 becomes larger as the focal point Pa of the detection laser beam LB2 becomes closer to the surface of the workpiece W and becomes smaller as the focal point Pa of the detection laser beam LB2 becomes farther from the surface of the workpiece W.

Preferably, the focal point Pa of the detection laser beam LB2 is always set to the inside of the workpiece W. That is, even when the focal point Pa of the detection laser beam LB2 is set to the inside of the workpiece W or above the surface of the workpiece W, if the distance from the surface of the workpiece W to the focal point Pa is the same, the quantity of light received by the second light receiving device 97 becomes the same. Therefore, the height position of the surface of the workpiece W can be detected without fail by setting the focal point Pa of the detection laser beam LB2 to the inside of the workpiece W.

Figure 5:
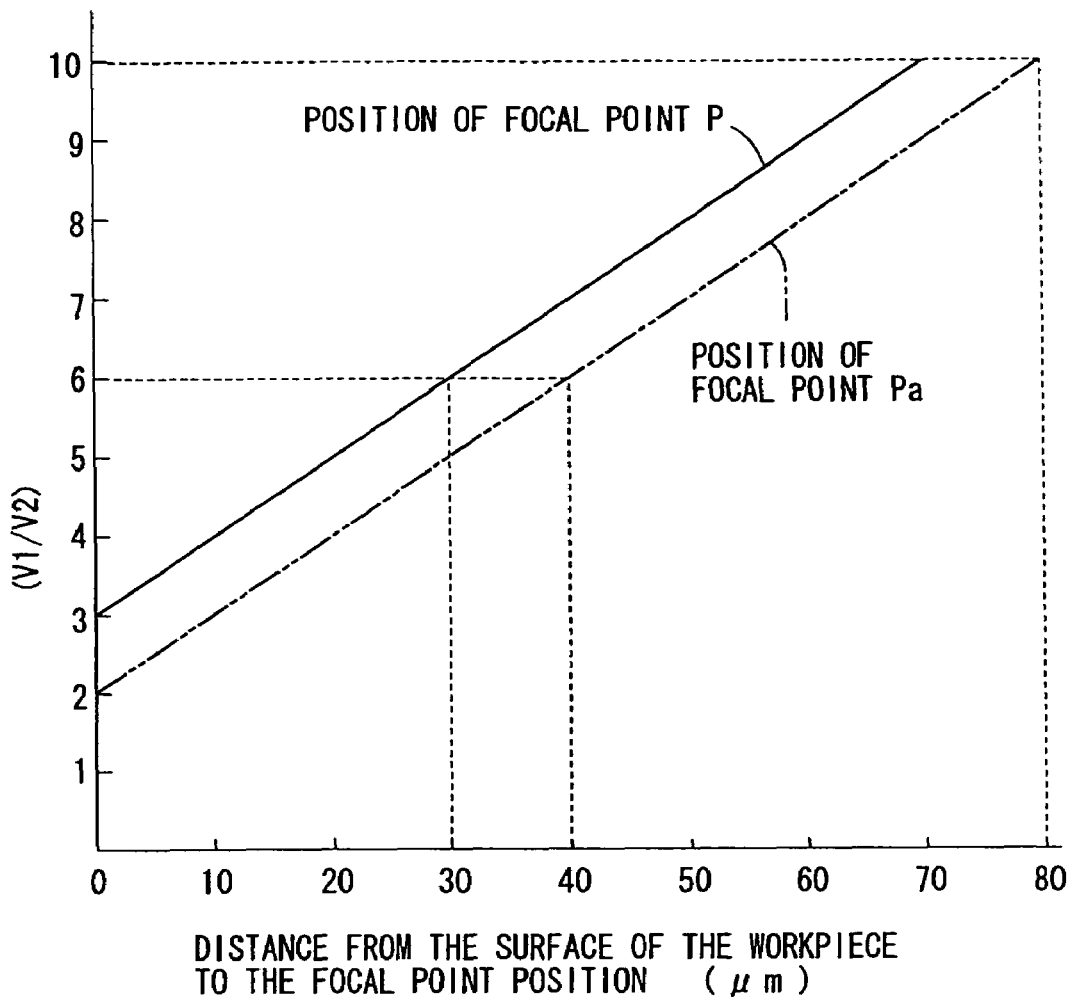
FIG. 5 is a control map showing the relationship between the ratio of a voltage value (V1) output from the first light receiving device to a voltage value (V2) output from the second light receiving device of the height position detection means shown in FIG. 2 and the position of the focal point of the detection laser beam in the workpiece.

The relationship between the ratio of the voltage value (V1) output from the above first light receiving device 96 to the voltage value (V2) output from the second light receiving device 97 and the position of the focal point Pa of the detection laser beam LB2 in the workpiece W will be described with reference to a control map shown in FIG. 5. In FIG. 5, the horizontal axis shows the position of the focal point Pa of the detection laser beam LB2, that is, the distance from the surface of the workpiece W to the inside. The vertical axis in FIG. 5 shows the ratio (V1/V2) of the voltage value (V1) output from the first light receiving device 96 to the voltage value (V2) output from the second light receiving device 97.

In the example shown in FIG. 5, when the position of the focal point Pa of the detection laser beam LB2 is 10 μm from the surface of the workpiece W, the above voltage value ratio (V1/V2) is "3" and when the position of the focal point Pa of the detection laser beam LB2 is 40 μm from the surface of the workpiece W, the above voltage value ratio (V1/V2) is "6". When the position of the focal point Pa of the detection laser beam LB2 is set to a position 10 μm below the position of focal point P of the processing pulse laser beam LB1 in FIG. 2, the above voltage value ratio (V1/V2) of the control map shown in FIG. 5 is set to a value obtained by correcting the difference corresponding to the interval between the focal point P and the focal point Pa. That is, since the focal point P of the processing pulse laser beam LB1 is positioned 10 μm above the focal point Pa of the detection laser beam LB2, the control map showing the focal point P of the processing pulse laser beam LB1 is formed as shown by the solid line in FIG. 5. Therefore, even when the workpiece W is not uniform in thickness, laser processing can be made at a position 30 μm from the surface of the workpiece W by setting the above voltage value ratio (V1/V2) to "6" and controlling the above focal point position adjusting means 71 to maintain the above voltage value ratio (V1/V2) at "6". The control map shown in FIG. 5 is stored in the memory of the control means which will be described later.

Figure 6:
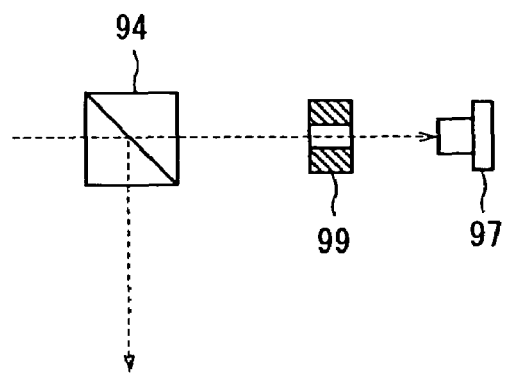
FIG. 6 is a block diagram showing another embodiment of a light receiving area restricting means constituting the height position detection means shown in FIG. 2.

In the height position detection means 9 shown in FIG. 2 in the illustrated embodiment, the light receiving area restricting means 98 is composed of the cylindrical lens 981 and the one-dimensional mask 982. As the light receiving area restricting means may be used a two-dimensional mask 99 for restricting the reflected light split into the second route by the above second cubic splitter 94 to a unit area as shown in FIG. 6. When the two-dimensional mask 99 is used, the graph of the control map shown in FIG. 5 shows parabolas.

Returning to FIG. 1, an image pick-up means 11 for detecting the area to be processed by the laser beam application means 52 is mounted to the front end portion of the casing 521 constituting the above laser beam application means 52. This image pick-up means 11 is constituted by an infrared illuminating means for applying infrared radiation to the workpiece, an optical system for capturing infrared radiation applied by the infrared illuminating means, and an image pick-up device (infrared CCD) for outputting an electric signal corresponding to infrared radiation captured by the optical system, in addition to an ordinary image pick-up device (CCD) for picking up an image with visible radiation. An image signal is supplied to the control means which will be described later.

The laser beam application unit 5 in the illustrated embodiment has a moving means 53 for moving the unit holder 51 along the pair of guide rails 423 and 423 in the direction indicated by the arrow Z. The moving means 53 comprises a male screw rod (not shown) arranged between the pair of guide rails 423 and 423 and a drive source such as a pulse motor 532 for rotary-driving the male screw rod. By driving the male screw rod (not shown) in a normal direction or reverse direction with the pulse motor 532, the unit holder 51 and the laser beam application means 52 are moved along the guide rails 423 and 423 in the direction indicated by the arrow Z. In the illustrated embodiment, the laser beam application means 52 is moved up by driving the pulse motor 532 in a normal direction and moved down by driving the pulse motor 532 in the reverse direction.

The laser beam processing machine in the illustrated embodiment comprises the control means 10. The control means 10 is composed of a computer comprising a central processing unit (CPU) 101 for carrying out arithmetic processing based on a control program, a read-only memory (ROM) 102 for storing the control program, etc., a read/write random access memory (RAM) 103 for storing the results of operations, an input interface 104 and an output interface 105. Detection signals from the above first light receiving device 96, the second light receiving device 97 and the image pick-up means 11 are input to the input interface 104 of the control means 10. Control signals are output to the above pulse motor 372, the pulse motor 382, the pulse motor 432, the pulse motor 532, the processing pulse laser beam oscillation means 6, the detection laser beam oscillation means 90, the angle adjusting actuator 713c of the first galvanoscanner 713 and the angle adjusting actuator 714c of the second galvanoscanner 714 from the output interface 105 of the control means 10.

The control map shown in FIG. 5 is stored in the read-only memory (ROM) 102 or the random access memory (RAM) 103.

The laser beam processing machine in the illustrated embodiment is constituted as described above, and its operation will be described hereinbelow.

Figure 7:
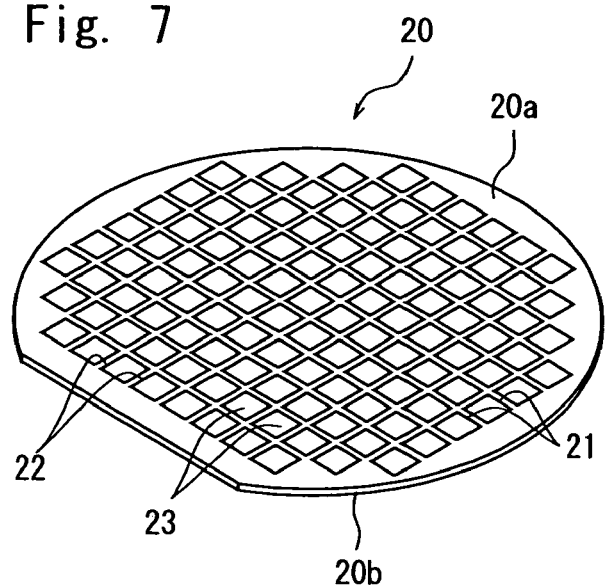
FIG. 7 is a perspective view of a semiconductor wafer as the plate-like workpiece.
Figure 8:
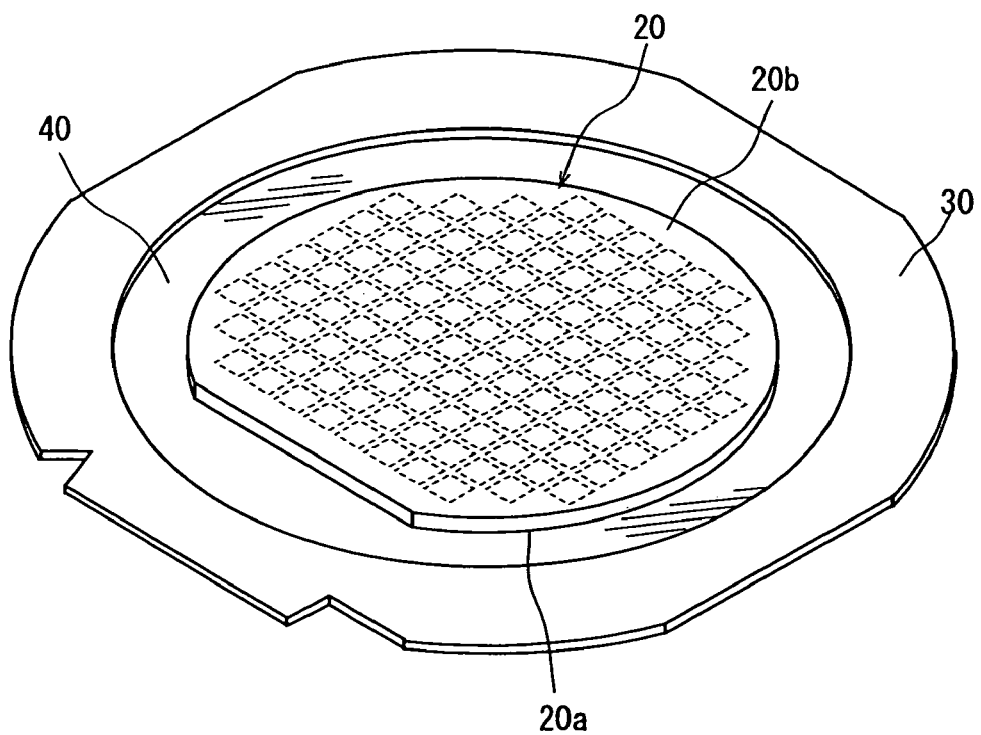
FIG. 8 is a perspective view showing the state of the semiconductor wafer shown in FIG. 7, which is affixed to the surface of a protective tape mounted on an annular frame.

FIG. 7 is a perspective view of a semiconductor wafer 20 as the workpiece to be divided by the wafer dividing method of the present invention. The semiconductor wafer 20 shown in FIG. 7 is, for example, a silicon wafer having a thickness of 100 μm, a plurality of areas are sectioned by a plurality of dividing lines 21 formed in a lattice pattern on the front surface 20a, and a device 22 such as IC or LSI is formed in each of the sectioned areas. The front surface 20a side of the semiconductor wafer 20 formed as described above is put on a protective tape 40 which is a synthetic resin sheet such as a polyolefin sheet mounted on an annular frame 30 as shown in FIG. 8. Therefore, the rear surface 20b of the semiconductor wafer 20 faces up.

The protective tape 40 side of the semiconductor wafer 20 supported to the annular frame 30 through the protective tape 40 as shown in FIG. 8 is placed on the chuck table 36 of the laser beam processing machine shown in FIG. 1. The semiconductor wafer 20 is suction-held on the chuck table 36 through the protective tape 40 by activating a suction means that is not shown. The annular frame 30 is fixed by the clamps 362.

The chuck table 36 suction-holding the semiconductor wafer 20 as described above is brought to a position right below the image pick-up means 11 by the processing-feed means 37. After the chuck table 36 is positioned right below the image pick-up means 11, alignment work for detecting the area to be processed of the semiconductor wafer 20 is carried out by the image pick-up means 11 and the control means 10. That is, the image pick-up means 11 and the control means 10 carry out image processing such as pattern matching, etc. to align a dividing line 21 formed in a predetermined direction of the semiconductor wafer 20 with the condenser 8 of the laser beam application means 52 for applying a laser beam along the dividing line 21, thereby performing the alignment of a laser beam application position. The alignment of the laser beam application position is also carried out on dividing lines 21 formed on the semiconductor wafer 20 in a direction perpendicular to the above predetermined direction. Although the front surface 20a having the dividing lines 21 of the semiconductor wafer 20 faces down at this point, as the image pick-up means 11 comprises an infrared illuminating means, an optical system for capturing infrared radiation and an image pick-up device (infrared CCD) for outputting an electric signal corresponding to the infrared radiation as described above, images of the dividing lines 21 can be picked up through the rear surface 20b.

Figure 9:
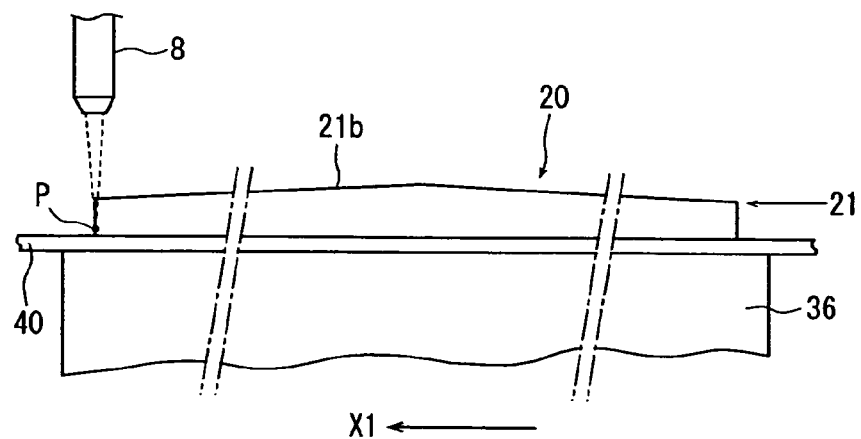
FIGS. 9(a) and 9(b) are explanatory diagrams showing the step of processing the workpiece with the laser beam processing machine shown in FIG. 1.
Figure 9:
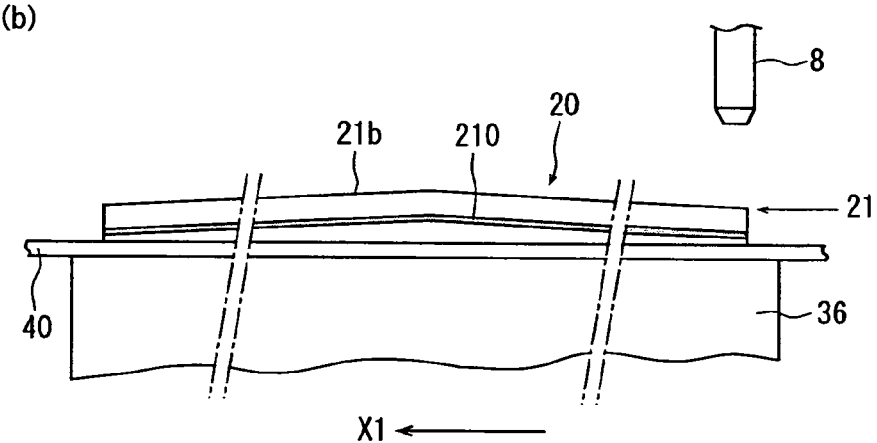

After the alignment of the laser beam application position is carried out by detecting the dividing line 21 formed on the semiconductor wafer 20 held on the chuck table 36 as described above, the chuck table 36 is moved to position one end (left end in FIG. 9(a)) of the predetermined dividing line 21 right below the condenser 8 of the laser beam application means 52 as shown in FIG. 9(a). Then, the control means 10 sets the ratio (V1/V2) of the voltage output from the first light receiving device 96 to the voltage value (V2) output from the second light receiving device 97 to "9" in the control map of FIG. 5 and controls the detection laser beam oscillation means 90 to oscillate the detection laser beam LB2. The control means 10 controls the above focal point position adjusting means 71 such that the ratio (V1/V2) of the voltage value (V1) output from the first light receiving device 96 which has received the reflected light of the detection laser beam LB2 to the voltage value (V2) output from the second light receiving device 97 becomes "9". As a result, the focal point P of the processing pulse laser beam LB1 is positioned 60 μm from the rear surface 20b (top surface) of the semiconductor wafer 20.

Thereafter, the control means 10 moves the chuck table 36 in the direction indicated by the arrow X1 at a predetermined processing-feed rate while it controls the laser beam application means 52 to apply the processing pulse laser beam LB1 from the condenser 8 (processing step). When the application position of the condenser 8 reaches the other end (right end in FIG. 9(b)) of the dividing line 21 as shown in FIG. 9(b), the application of the processing pulse laser beam LB1 is suspended and the movement of the chuck table 36 is stopped. In this processing step, the height position of the rear surface 20b (top surface) of the semiconductor wafer 20 is detected by the height position detection means 9, and the voltage value (V1) output from the above first light receiving device 96 and the voltage value (V2) output from the second light receiving device 97 are supplied to the control means 10. The control means 10 calculates a voltage value (V1/V2) based on the voltage value (V1) output from the above first light receiving device 96 and the voltage value (V2) output from the second light receiving device 97. When the voltage value (V1/V2) is not "9", the control means 10 controls the angle adjusting actuator 713c of the first galvanoscanner 713 and the angle adjusting actuator 714c of the second galvanoscanner 714 constituting the above focal point position adjusting means 71 to change the voltage value (V1/V2) to "9". As a result, a deteriorated layer 210 is formed parallel to the rear surface 20b (top surface) at a position 60 μm from the rear surface 20b (top surface) in the inside of the semiconductor wafer 20 as shown in FIG. 9(b).

The processing conditions in the above processing step are set as follows, for example.

Figure 10:
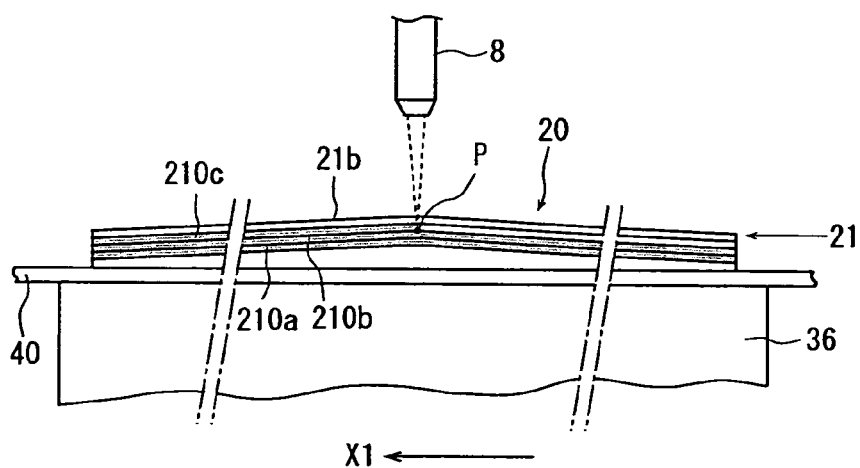
FIG. 10 is an explanatory diagram showing the processing step when the workpiece is thick.

Processing laser: YVO4 pulse laser
Wavelength: 1,064 nm
Repetition frequency: 100 kHz
Focal spot diameter: 1 μm
Processing-feed rate: 100 mm/sec Under the above processing conditions, the deteriorated layer 210 having a thickness of about 20 μm can be formed. When the semiconductor wafer 20 is thick, as shown in FIG. 10, a plurality of deteriorated layers 210a, 210b and 210c can be formed by changing the above voltage value (V1/V2) to "7" and "5" stepwise so as to position the focal point P 20 μm above its previous position and carrying out the above processing step several times.

After the above processing step is carried out along all the dividing lines 21 extending in the predetermined direction of the semiconductor wafer 20 as described above, the chuck table 36 is turned at 90° to carry out the above processing step along dividing lines 21 extending in a direction perpendicular to the above predetermined direction. After the above processing step is carried out along all the dividing lines 21 formed on the semiconductor wafer 20, the chuck table 36 holding the semiconductor wafer 20 is returned to a position where it first suction-held the semiconductor wafer 20 to cancel the suction holding of the semiconductor wafer 20. The semiconductor wafer 20 is carried to the dividing step by unshown conveying means.

Since the detection laser beam LB2 is applied to the workpiece through the focal point position adjusting means 71 for adjusting the focal spot P of the processing pulse laser beam LB1 to detect the height position of the workpiece based on its reflected light and the focal point position adjusting means 71 is controlled based on this detection value in the laser beam processing machine in the illustrated embodiment, the position of the focal point P of the processing pulse laser beam LB1 can be adjusted in accordance with the undulation of the workpiece without producing a time lag. Therefore, laser processing can be made at a position parallel to the surface of the workpiece.

What is claimed is:

1. A laser beam processing machine comprising a chuck table having a workpiece holding surface for holding a plate-like workpiece and a laser beam application means for applying a laser beam to the top surface of the workpiece held on the chuck table, the laser beam application means comprising a processing laser beam oscillation means for oscillating a processing laser beam and a condenser for converging the processing laser beam oscillated by the processing laser beam oscillation means, wherein the laser beam processing machine further comprises a focal point position adjusting means which is interposed between the processing laser beam oscillation means and the condenser and shifts the position of the focal point of the processing laser beam converged by the condenser, a height position detection means for detecting the height position of the top surface of the workpiece held on the chuck table, and a control means for controlling the focal point position adjusting means based on a detection signal from the height position detection means;

the height position detection means comprises a detection laser beam oscillation means for oscillating a detection laser beam having a wavelength different from the wavelength of the processing laser beam oscillated by the processing laser beam oscillation means, a dichroic half mirror which is interposed between the processing laser beam oscillation means and the focal point position adjusting means, allows the processing laser beam oscillated from the processing laser beam oscillation means to pass through and deflects a detection laser beam oscillated from the detection laser beam oscillation means toward the focal point position adjusting means, a first splitter which is interposed between the dichroic half mirror and the detection laser beam oscillation means, allows the detection laser beam oscillated from the detection laser beam oscillation means and deflects reflected light deflected by the dichroic half mirror, a band pass filter which allows only reflected light corresponding to the wavelength of the detection laser beam to pass through out of the reflected light deflected by the first splitter, a second splitter which splits the reflected light passing through the band pass filter into a first route and a second route, a first light receiving device for receiving the reflected light split into the first route by the second splitter, a second light receiving device for receiving the reflected light split into the second route by the second splitter, and a light receiving area restricting means which is arranged in the second route and restricts the reception area of the reflected light received by the second light receiving device; and the control means calculates the ratio of the quantity of light received by the first light receiving device to the quantity of light received by the second light receiving device and controls the focal point position adjusting means so that the ratio becomes a predetermined value.

2. The laser beam processing machine according to claim 1, wherein a condenser lens for converging 100% of the reflected light split into the first route and transmitting the converged light to the first light receiving device is installed in the first route, and the light receiving area restricting means is composed of a cylindrical lens for converging the reflected light split into the second route one-dimensionally and a one-dimensional mask for restricting the reflected light converged by the cylindrical lens one-dimensionally to a unit length.

3. The laser beam processing machine according to claim 1, wherein a condenser lens for converging 100% of the reflected light split into the first route and transmitting the converged light to the first light receiving device is installed in the first route, and the light receiving area restricting means is a two-dimensional mask for restricting the reflected light split into the second route to a unit area.

4. The laser beam processing machine according to claim 1, wherein the focal point position adjusting means comprises a first galvanoscanner and a second galvanoscanner, each consisting of a first mirror and a second mirror which are arranged parallel to each other with their reflected surfaces opposed to each other and an angle adjusting actuator for adjusting the installation angles of the first mirror and the second mirror.

5. The laser beam processing machine according to claim 1, wherein the position of the focal point of the detection laser beam is set to the inside of the workpiece held on the chuck table.

* * * * *